(12) United States Patent
Walls

(10) Patent No.: US 8,335,693 B2
(45) Date of Patent: *Dec. 18, 2012

(54) SYSTEM AND METHOD OF IDENTIFYING SHIPPING ANOMALIES

(75) Inventor: Gary D Walls, Longmont, CO (US)

(73) Assignee: United States Postal Service, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 13/434,662

(22) Filed: Mar. 29, 2012

(65) Prior Publication Data

US 2012/0185403 A1 Jul. 19, 2012

Related U.S. Application Data

(62) Division of application No. 12/039,570, filed on Feb. 28, 2008, now Pat. No. 8,150,705.

(60) Provisional application No. 60/904,629, filed on Mar. 2, 2007, provisional application No. 60/892,839, filed on Mar. 3, 2007.

(51) Int. Cl.
*G06Q 10/00* (2012.01)
*G06Q 30/00* (2012.01)
*G06K 9/00* (2006.01)

(52) U.S. Cl. ......... 705/1.1; 705/330; 705/332; 705/338; 382/101

(58) Field of Classification Search .......... 705/1.1, 705/330, 332, 338; 382/101
See application file for complete search history.

(56) References Cited

U.S. PATENT DOCUMENTS

| | | | |
|---|---|---|---|
| 5,072,400 | A | 12/1991 | Manduley |
| 5,319,562 | A | 6/1994 | Whitehouse |
| 5,745,590 | A | 4/1998 | Pollard |
| 6,175,827 | B1 | 1/2001 | Cordery et al. |
| 6,311,892 | B1 | 11/2001 | O'Callaghan et al. |
| 6,415,983 | B1 | 7/2002 | Ulvr et al. |
| 6,430,543 | B1 | 8/2002 | Lee et al. |
| 6,578,874 | B1 | 6/2003 | Kubert et al. |
| 7,407,098 | B2 | 8/2008 | Jouvin et al. |
| 7,590,544 | B2 | 9/2009 | Snapp |
| 7,765,024 | B2 | 7/2010 | Brandt et al. |
| 8,005,568 | B2 * | 8/2011 | Hamilton ............ 700/225 |
| 2003/0045945 | A1 | 3/2003 | Lopez |
| 2003/0101271 | A1 | 5/2003 | Smith et al. |
| 2004/0133443 | A1 | 7/2004 | Payne et al. |
| 2004/0215480 | A1 | 10/2004 | Kadaba |
| 2004/0243452 | A1 | 12/2004 | Barton et al. |
| 2006/0047419 | A1 * | 3/2006 | Diendorf et al. ...... 701/208 |
| 2006/0212304 | A1 | 9/2006 | Krause |
| 2007/0109105 | A1 | 5/2007 | Ohno et al. |
| 2008/0130947 | A1 | 6/2008 | Ross et al. |

FOREIGN PATENT DOCUMENTS

JP 2009237823 A 10/2009

OTHER PUBLICATIONS

International Search Report from PCT/US08/55363, dated Aug. 1, 2008.

\* cited by examiner

*Primary Examiner* — Fadey Jabr
(74) *Attorney, Agent, or Firm* — Knobbe Martens Olson & Bear LLP

(57) ABSTRACT

Systems and method of identifying shipping anomalies are provided. One anomaly detection module is configured to access data related to items in a delivery environment and determine the occurrence of anomalies based on the accessed data. The detected anomalies are evaluated with other accessed data to identify source, destination or routing errors and to correct same.

16 Claims, 12 Drawing Sheets

800 - ANOMALY DETECTION MODULE

802 – DATA RETRIEVAL MODULE

804 – DATA STORAGE

806 – DATA ANALYSIS MODULE

808 – SERVICE RECOVERY MODULE

*FIG. 8*

SYSTEM AND METHOD OF IDENTIFYING SHIPPING ANOMALIES

CROSS-REFERENCE TO RELATED APPLICATIONS

This application is a divisional of U.S. application Ser. No. 12/039,570, filed on Feb. 28, 2008, which claims the benefit of U.S. Provisional Patent Application No. 60/904,629, filed on Mar. 2, 2007, and of U.S. Provisional Patent Application No. 60/892,839, filed on Mar. 3, 2007. Each of the above-referenced applications is hereby incorporated by reference in its entirety.

BACKGROUND

1. Field of the Invention

This development relates to item tracking in distributed delivery environments. More particularly, this development is directed to systems and methods which identify performance issues and the causes thereof by capturing and analyzing data related to item processing through the distributed delivery environment.

2. Description of the Related Technology

In many existing large-scale distributed delivery environments, items which are processed within the delivery environment are tagged or associated with identifying information that allows the items to be tracked as they are routed through the system. Items are typically tracked as they proceed through the system by scanning identifying tags which are affixed to the items. In some cases, items are misrouted due to tagging or scanning errors. A tagging error occurs when an identifying tag does not correctly represent all of the relevant data about an item. Scanning errors occur when the data scanned for an item is not indicative of the correct data for the item. These errors can be caused by various factors. For example, an error may be caused by physical defects related to the delivery item, such as obstruction of part of the destination code. Other errors may be caused by tagging or scanning errors which occur when the delivery destination code is correctly read, but faulty logic in the scanning machine causes the item to be sent to an incorrect location. When tagging and scanning errors occur in a distributed delivery environment, items can be misrouted resulting in a delivery delay. In automated delivery environments, items may be repeatedly misrouted because the items are typically placed back into the distribution system, and whatever routing disruption originally occurred repeats itself Sometimes this results in the item not being delivered at all and returned to the sender if possible, or discarded. Thus, scanning errors and tagging errors can result in substantial delivery delays or even non-delivery. In view of these problems and deficiencies, systems and methods are needed which allow for the identification and correction of routing errors in order to prevent substantial delays in the delivery of the misrouted items.

SUMMARY OF CERTAIN INVENTIVE ASPECTS

The system, method, and devices of the present development each have several aspects, no single one of which is solely responsible for its desirable attributes. Without limiting the scope of this development, several of its features will now be discussed briefly.

In one embodiment, a computer-implemented method of identifying distribution anomalies in a multi-point, automated, item delivery system is provided. The method provides for storing data indicative of a first destination delivery code and a second destination delivery code. Both the first and second destination delivery codes may be associated with an item to be delivered to one of a first or second destination. The first destination delivery code is compared to the second destination delivery code in order to determine if there is a discrepancy between the first destination delivery code and the second destination delivery code. If a discrepancy is detected, the method further includes determining which of the first and second destination delivery codes is the correct delivery code. A notification may then be sent which is indicative of the discrepancy.

In another embodiment, a computer-implemented method of identifying a source of misrouted items in a delivery network having a plurality of nodes is described. The method includes receiving data indicative of an item's presence at least at some of the plurality of nodes in the delivery network, the data comprising a plurality of records each associated with the item's presence at one of the nodes, each of the plurality records having a destination code data field indicative of the a delivery destination for the item. A first value is determined for the destination code field among the records. A second value for the destination code field is identified among the plurality of records. The second value is different from the first value. Based on the location associated with the record having the second value, the source of the misrouted item is determined.

Another embodiment comprises a computer-readable medium having computer executable instructions stored thereon, which when executed by a processor cause a computing device to perform a method of identifying distribution anomalies in a multi-point, automated, item delivery system. The method provides for storing data indicative of a first destination delivery code and a second destination delivery code. Both the first and second destination delivery codes may be associated with an item to be delivered to one of a first or second destination. The first destination delivery code is compared to the second destination delivery code, and a discrepancy is detected among the first destination delivery code and the second destination delivery code. The method further includes determining which of the first and second destination delivery codes is the correct delivery code. A notification may then be sent which is indicative of the discrepancy.

Still another embodiment comprises a computer-readable medium having computer executable instructions stored thereon, which when executed by a processor cause a computing device to perform a method of identifying a source of misrouted items in a delivery network. The delivery network has a plurality of nodes comprising a delivery route. The method includes receiving data indicative of an item's presence at least at some of the plurality of nodes in the delivery network, the data comprising a plurality of records each associated with the item's presence at one of the nodes, each of the plurality records having a destination code data field indicative of the a delivery destination for the item. A first value is determined for the destination code field among the records. A second value for the destination code field is identified among the plurality of records. The second value is different from the first value. Based on the location associated with the record having the second value, the source of the misrouted item is determined.

In still another embodiment, a system for identifying distribution anomalies in a multi-point, automated, item delivery system is provided. The system includes means for storing data indicative of a first destination delivery code and a second destination delivery code, each of the first and second destination delivery codes being associated with an item to be delivered to one of the destinations; means for comparing the first destination delivery code to the second destination delivery code; means for detecting a discrepancy between the first destination delivery code and the second destination delivery code; means for determining which of the first and second destination delivery codes is the correct delivery code; and means for sending a notification indicative of the discrepancy.

In still another embodiment, a system for identifying a source of misrouted items in a delivery network, the delivery network comprising a plurality of nodes comprising a delivery route, is provided. The system includes means for receiving data indicative of an item's presence at least at some of the plurality of nodes in the delivery network, the data comprising a plurality of records each associated with the item's presence at one of the nodes, each of the plurality of records having a destination code data field indicative of the a delivery destination for the item; means for determining a first value for the destination code field among the records; means for identifying a second value for the destination code field among the plurality of records, the second value being different from the first value; and means for determining, based on the location associated with the record having the second value, the source of the misrouted item.

BRIEF DESCRIPTION OF THE DRAWINGS

In this description, reference is made to the drawings wherein like parts are designated with like numerals throughout.

FIG. 8 is a block diagram of an anomaly detection module in accordance with one or more embodiments.

DETAILED DESCRIPTION OF CERTAIN INVENTIVE EMBODIMENTS

The following detailed description is directed to certain specific embodiments of the development. However, the development can be embodied in a multitude of different ways as defined and covered by the claims. In this description, reference is made to the drawings wherein like parts are designated with like numerals throughout. Various embodiments provided herein are directed to systems and methods for identifying distribution anomalies in distributed delivery environments. An anomaly detection system is configured to identify and provide notification of distribution anomalies which, if not corrected, may considerably delay the delivery of a particular item. Various embodiments may be implemented in the context of a large scale, multi-point, semi-automated delivery system.

Figure 1:
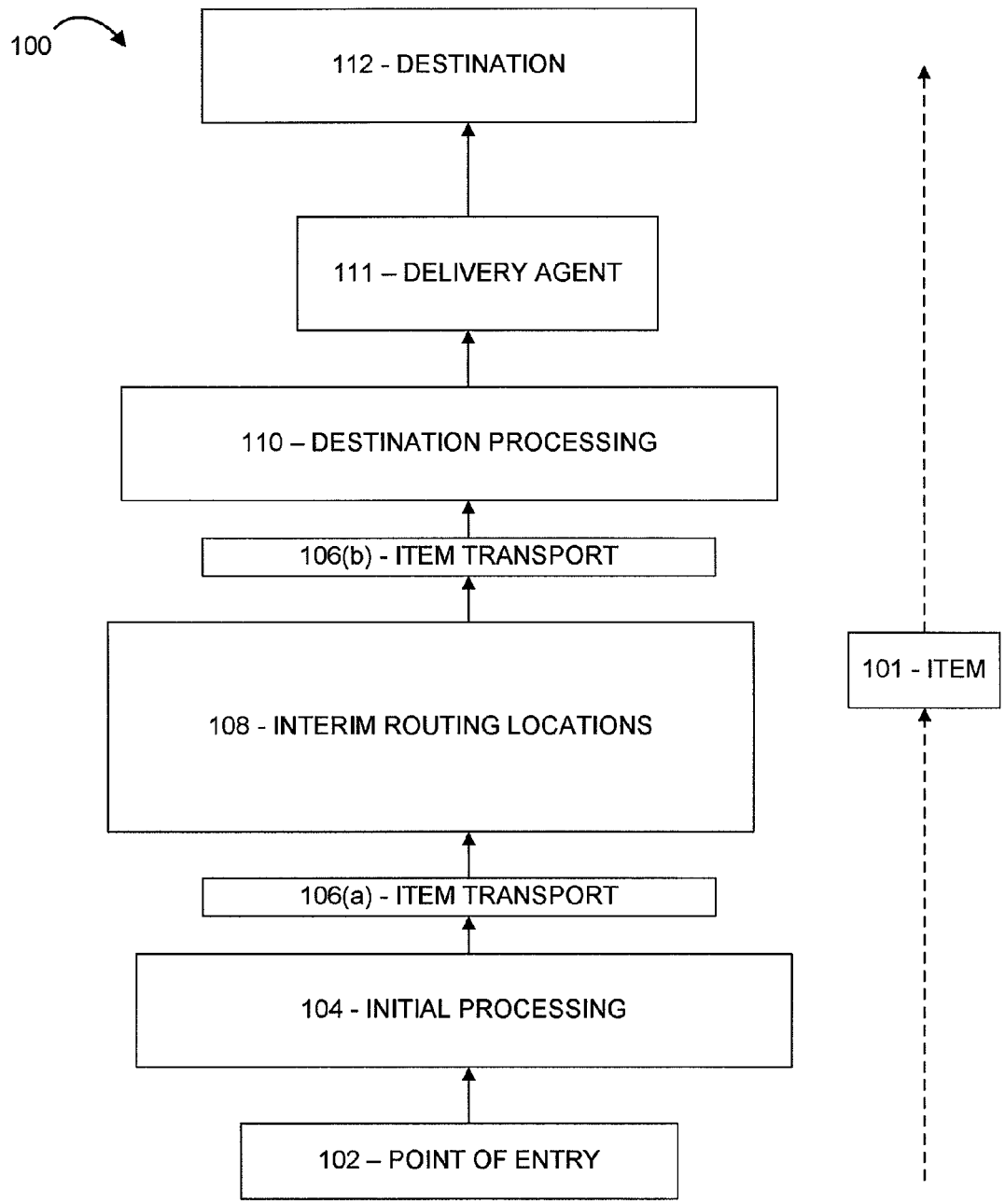
FIG. 1 is a flow chart illustrating an example of a typical delivery process for an item.

FIG. 1 provides an example of a distribution environment 100 which comprises a process which may be used to transport one or more items 101 from a first location to a destination location. The item 101 enters the distribution environment process at a point of entry 102. The point of entry 102 is a location at which an item 101 originally enters the distribution environment 100. The point of entry 102 may be any of several types of locations such as, for example, a drop box, a shipping dock, a post office, a distribution center, a warehouse, a mailbox at a residence, or some other location. The source of the item 101 may be its point of origin, for instance, its place of generation. For example, the source could be a department within a company or any other place generating items for delivery. Other sources could be an owner or agent of the item, a person, a machine or some other thing which places the item at the point of entry 102. The item 101 typically is received at the point of entry 102 and is brought to an initial processing system 104. The initial processing system 104 is the location at which the item 101 is initially processed into the distribution environment 100. The initial processing system 104 may be a local post office, a warehouse, a port terminal, an airport, a rail yard, or some other location in which an item 101 is processed and transported further within the distribution environment 100. The details of the initial processing system 104 are discussed below in connection with FIG. 2.

Once the item 101 has been initially processed into the distribution environment 100, it is advanced to an item transport 106. The item transport 106 is typically a transportation device such as a truck, ship, aircraft, or train. In other cases, the item transport can also be a trailer, container, pallet, conveyer belt or forklift. In the example provided in FIG. 1, the item transport 106(a) brings the item 101 from the initial processing center 104 to one or more interim routing locations 108. The interim routing locations 108 are typically hub-type locations which collect items 101 from many different initial processing locations 104 and sort the items 101 so that they may then be sent to the next appropriate routing location. Sometimes, an interim routing location 108 simply routes an item 101 to another interim routing location 108. Ultimately, however, the interim routing location 108 provides the item 101 (or more likely a group of items) to another item transport 106 such as item transport 106(b) which moves the item 101 to a destination processing station 110.

The destination processing station 110 may be located at any of various types of locations including a local delivery warehouse, shipping terminal, a dock, a port, a post office, or some other location. At destination processing station 110, the item 101 is processed and provided to a delivery agent 111. A delivery agent 111 is any person or thing which is responsible for bringing an item to its final destination 112 in the distribution environment 100. A delivery agent 111 may be, for example, a delivery truck driver, a mailman or some other delivery agent. The destination location 112 is the place at which the item 101 is delivered and from whence it exits the distribution environment 100. The systems and methods disclosed herein may be applied to various distribution methods and may include enclosed types of distribution environment such shipyards, warehouses, and airports as well as remote delivery distribution environments.

While a particular distribution environment 100 has been described in FIG. 1, a skilled artisan will appreciate that the systems and methods described herein may be applied to various distribution system configurations. For example, some distribution systems may not include interim routing locations 108 and may instead use item transports 106 to bring items directly from an initial processing system 104 to a destination processing station 110.

Figure 2:
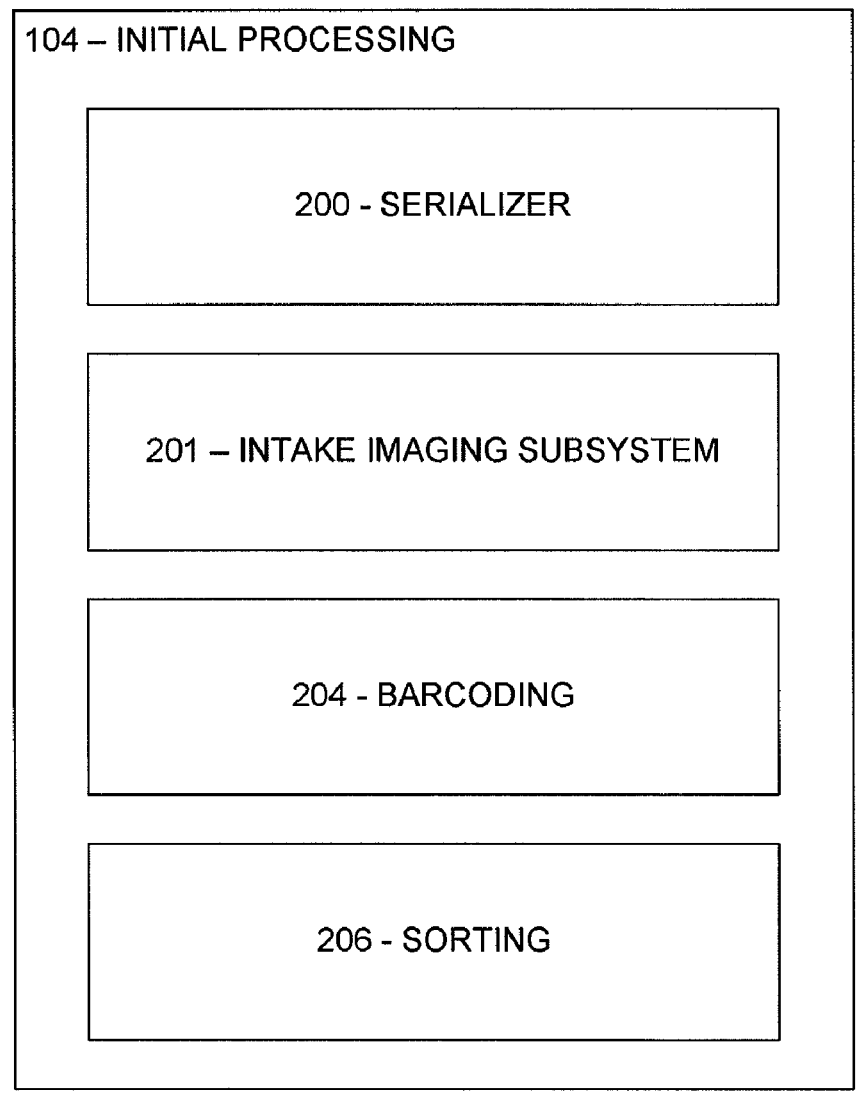
FIG. 2 is a block diagram of various components of the initial processing location shown in FIG. 1.

Referring now to FIG. 2, a more detailed view of an exemplary initial processing system 104 is provided. The initial processing system 104 includes an intake serializer 200. The intake serializer 200 is a system which separates each item 101 received at the initial processing system 104 and assigns it a serial number which is associated with that item as it proceeds through the delivery environment 100. The serializer 200 may be part of a larger sorting machine such as a mail processing machine, or it may be a stand alone device. Once the item 101 has been assigned a serial number, and the serial number is stored in a memory (as will be described in connection with FIG. 4 below), a barcode technology 204 is used to apply a barcode to the item. The barcode is indicative of the assigned serial number. The serial number may be unique to each item for a predetermined amount of time. For instance, a range of serial numbers may be kept in circulation, with each one being reused every thirty days (or some arbitrary time period). While the item for delivery is in the delivery system, however, the serial number is unique to that item.

Once the item has been serialized and barcoded, it is then passed to an intake imaging subsystem 201. The intake imaging subsystem 201 accomplishes various functions which are discussed below.

Items 101 received into the distribution environment 100 typically have a final intended delivery address physically listed on some part of the item 101. For example, an envelope placed into the delivery environment may have an address typed or handwritten on its exterior surface. A larger parcel such as a flat or a box may have a packing slip affixed to its exterior which includes the destination location. Larger parcels may also include handwritten addresses. A shipping container item 101 may have affixed to it a shipping manifest or packing slip The intake imaging subsystem 201 is used to digitize the delivery location listed on the item and store this digital information for later use. The intake imaging subsystem 201 may take various forms. In one embodiment, the initial processing system 104 includes processing equipment which scans the outer surface of the item 101 to determine the delivery location listed on the item. The imaging subsystem 201 may utilize optical character recognition (OCR) technology to determine the delivery location listed on the item 101. The OCR technology typically receives an image of the address information on the item 101 which has been captured by a camera and attempts to determine the precise address listed on the item 101. If the address is recognized, it is stored and associated with the serial number which was created for the item. If the intake imaging subsystem 201 is not able to discern a delivery location code (e.g. address and zip code) from the materials written on the outside of the item 101, in some embodiments, the image captured by the subsystem 201 may be sent electronically over a wide area network to a human agent who can attempt to read the delivery location and key it into the data storage manually.

Once the delivery location has been stored with the associated serial number, a barcode indicative of the delivery location is then placed on the item using the barcode technology 204. The barcode technology 204 used to apply the delivery barcode may be the same technology as used to apply the serial number as described above, or it may be a different barcode apparatus.

Thus, once the item 101 has been processed by the serializer 200 and the intake imaging subsystem 201, and has further been barcoded by the barcode technology 204, it has two external barcodes. The first barcode is indicative of the serial number assigned to the item 101, and the second barcode is indicative of a delivery location for the item. In some embodiments, the barcodes are located in different areas on the item 101. For example, in the case of a letter envelope, the serial number barcode may be placed on the back of the letter, while the delivery location barcode may be placed on the front of the letter. The delivery location barcode may be associated with an eleven digit postal code, for example, which is unique to the delivery location specified on the item 101. However, the delivery location barcode may be associated with other types of delivery codes such as identification numbers for plant locations or other types of delivery destinations.

Once an item 101 has been sufficiently tagged, it may be sorted using sorting technology 206 which scans the delivery location barcode on the front of each received item 101, and sorts the item 101 accordingly. In some embodiments, the item 101 are sorted by its intended destination. Other sorting criterion may be used.

Figure 3A:
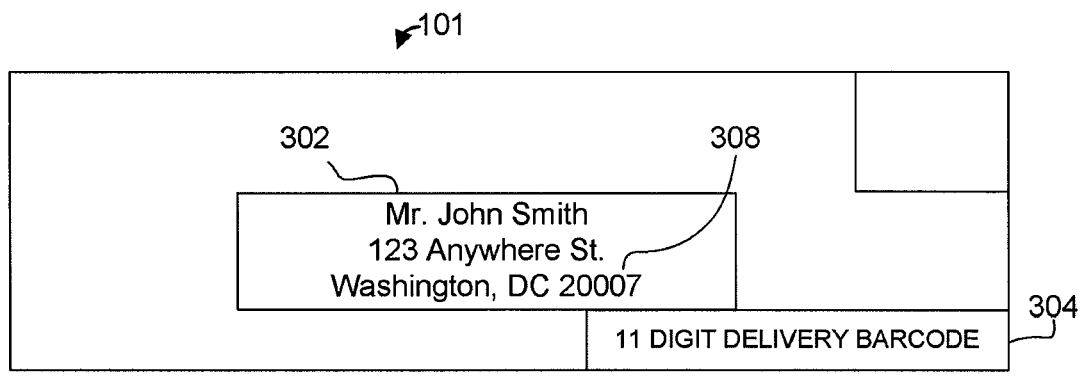
FIG. 3(a) is a front view of an envelope showing a barcode thereon.
Figure 3B:
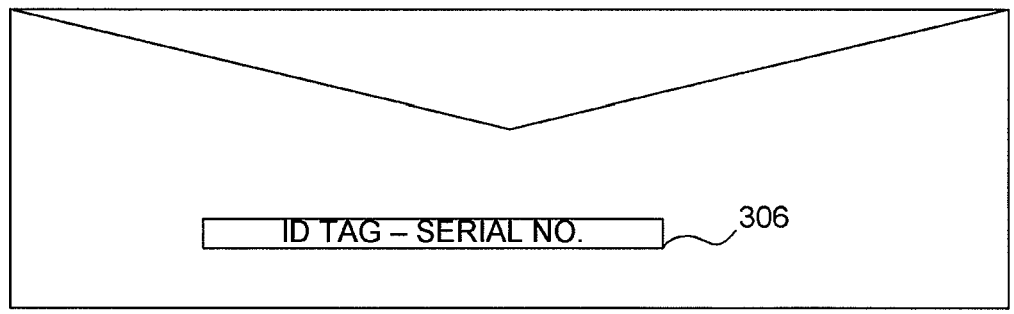
FIG. 3(b) is a back view of the envelope of FIG. 3(a) showing an additional barcode located thereon.

Referring now to FIG. 3(*a*), an example of the front of an item 101 which has been processed in the initial processing center 104 is shown. The front of the item 101 includes a delivery location 302 which has been placed on the item prior to its initial processing in the initial processing system 104. As noted above, the delivery location 302 may be a postal address or some other location. The delivery location may be typed or handwritten. In the lower right corner of the front side of the item 101, a delivery barcode is shown. In this particular example, the delivery barcode is an eleven digit postal code which provides a unique identifier for the delivery location 302. The barcode has been added by the barcode technology 204. In the example provided in FIG. 3(*a*) the barcode has been sprayed onto the front surface of the item 101 using ink jet technology. In other implementations, the bar code may be printed on a sticker which is placed on the envelope. A skilled artisan will appreciate, however, that other methods may be used to apply the barcode.

With reference to FIG. 3(*b*), an example of the back of a processed item 101 is provided. As noted above, when the serializer 200 determines a serial number for the item 101, a barcode indicative of the serial number is placed on the back of the item 101. In the example provided in FIG. 3(*b*), the barcode value is the serial number 306. While the examples described include the use of barcode, a skilled artisan will readily appreciate that other types of identifying technologies such as RFID tags may be used.

Figure 4:
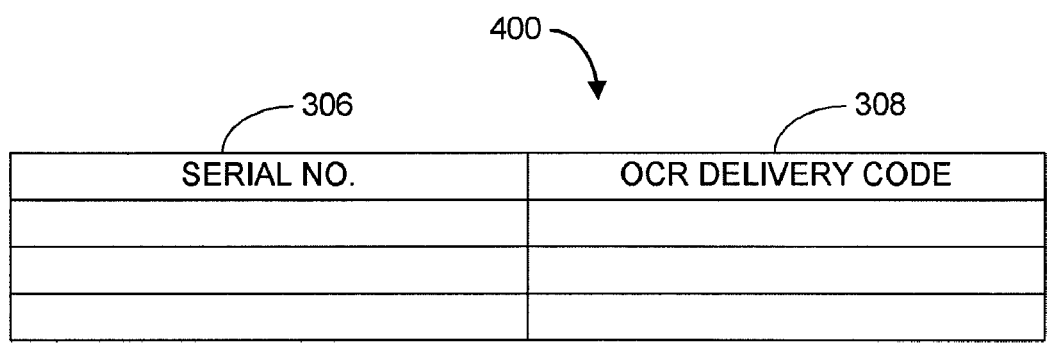
FIG. 4 is an example of a database table for storing a item serial number and its associated delivery code.

As noted above in connection with FIG. 2, the serializer 200 determines a unique identifier for items 101 received into the distribution environment 100 and stores that serial number for later use. With reference to FIG. 4, an example of a table 400 for storing serial numbers 306 of items 101 is provided. The table definition 400 includes a first field which stores the serial number 306 (which has been placed on the back of item 101 in the form of a barcode or some other machine-readable form). The table definition 400 further includes a second field which stores the delivery code 308 which was associated with the item 101 by the intake imaging subsystem 201 during the initial processing.

As noted above, the item 101 enters the distribution environment 100 at a point of entry 102 and is then taken to an initial processing center 104. After the initial processing has been completed, the item is taken to one or more interim locations 108 by an item transport 106. In some embodiments, the item 101 is traced as it moves through the distribution environment 100 by scanning the delivery code barcode 304 on the front of the item 101 each time it enters and leaves an interim location 108. The interim locations 108 may be bulk processing facilities in which multiple sorting devices are used to help ensure that items 101 reach their next location. Each sorting device may also be equipped with a barcode scanner which reads the delivery code barcode 304 to determine where to route the item 101. The serial number barcode 306 may also be scanned to provide a record that the item 101 was processed in that location. Each of the interim locations 108 may be equipped with a network connection that allows the scanned data to be sent to another remote location for data storage.

Figure 5:
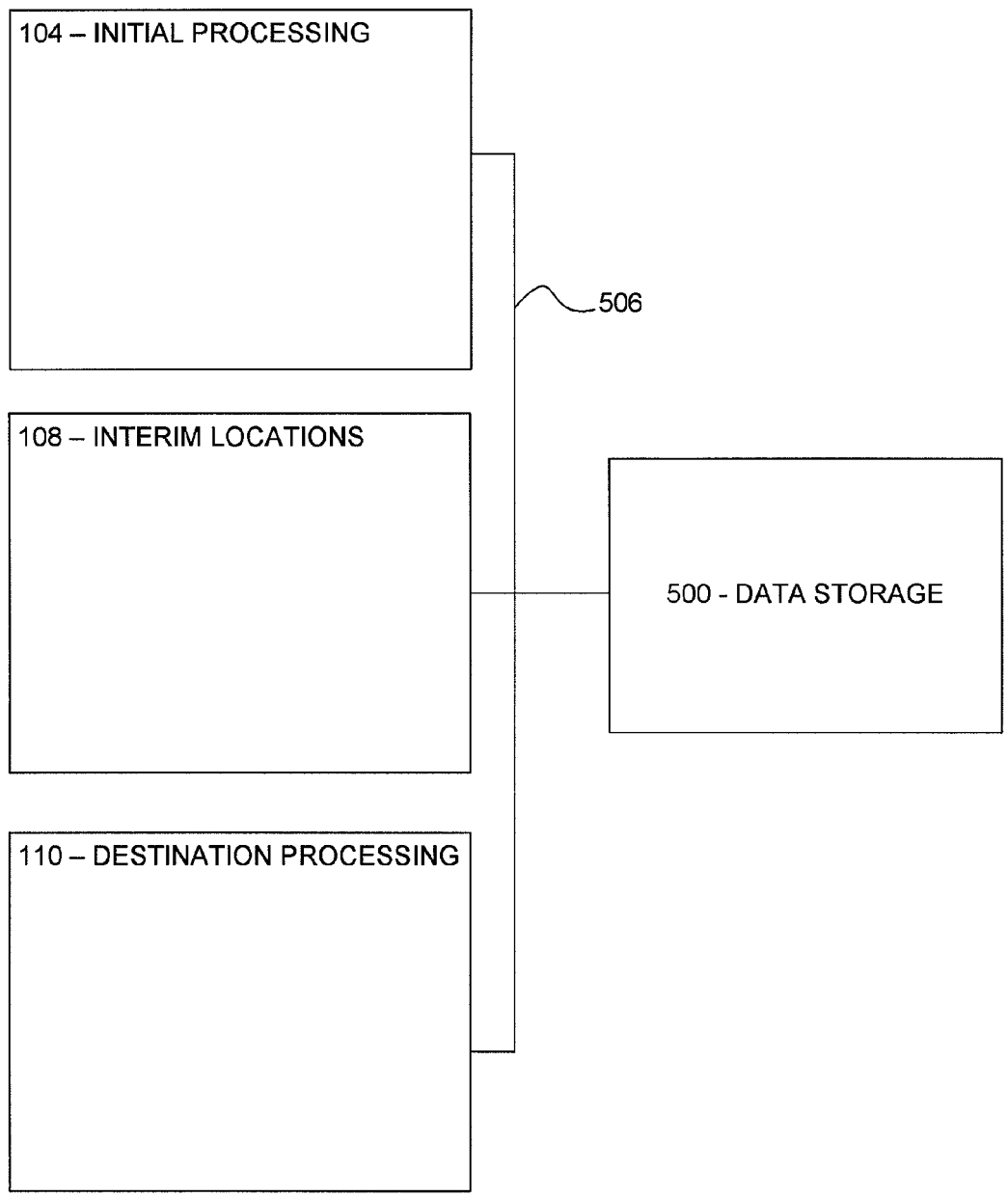
FIG. 5 is a block diagram of a network environment which allows scanned barcode values to be stored in accordance with certain embodiments.

Referring now to FIG. 5, an example of a wide area network environment is shown which allows an item to be accurately tracked as it moves through the distribution environment 100. As shown in the figure, the initial processing system 104, the interim locations 108, and the destination processing stations 110 are all connected to a data storage medium 500 via a network connection 506. The network connection 506 may be a wide area network (WAN) which utilizes a protocol such as TCP/IP to transport data. The data storage medium 500 may comprise one or more storage devices which may be located in a single or multiple different places. The data storage medium 500 may include the data table 400 shown in FIG. 4 in its data. When an item 101 is scanned in any of the locations shown in the figure, the data generated by the scan is sent via the network connection 506 to the data storage 500. The serializer 200, the intake imaging subsystem 201, and the barcode device 204 may each utilize a network interface which allows them to send and receive data over the network 506.

Figure 6:
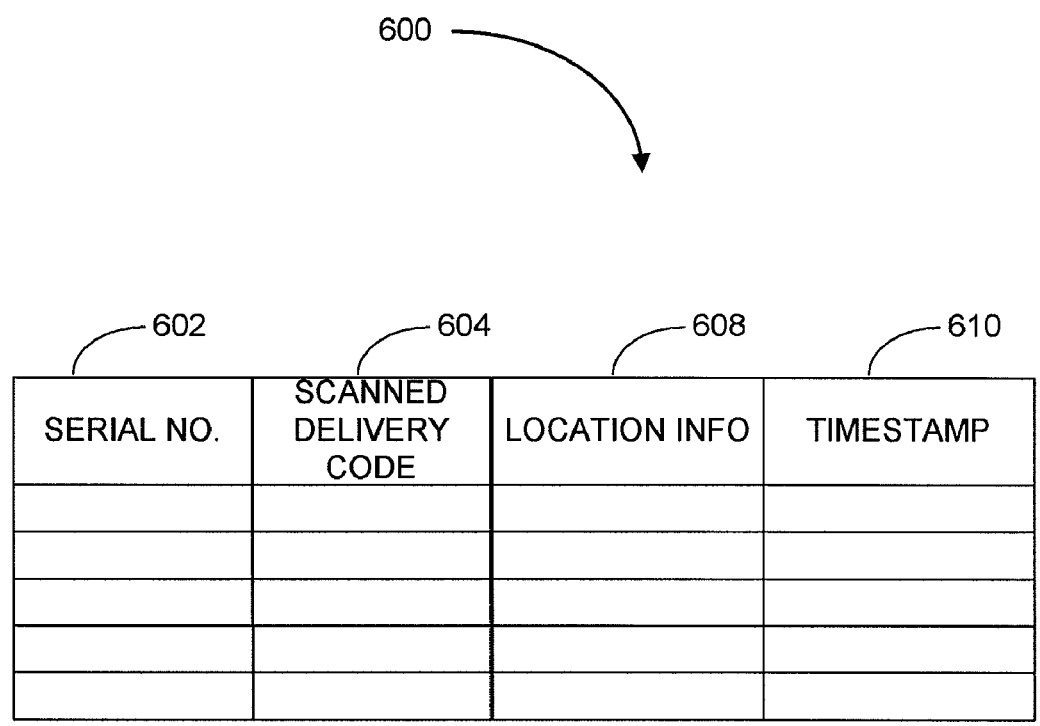
FIG. 6 is an example of a database table which may be used to store data related to an item as it progresses through the delivery environment of FIG. 1.

In order to accurately trace the item 101 throughout the system, each time the item 101 is scanned in the distribution environment 100, that data may be sent to the data storage medium 500 to create a transaction record for that scanning event. FIG. 6 is an exemplary illustration of a data table 600 for a transaction record for an item 101 as it progresses through the distribution environment 100. The data table 600 includes a serial number field 602 which stores the serial number 306 by scanning the first-applied bar code 204 on the item 101, which is located, for example, on the back of the item 101. The data table 600 further includes a scanned delivery code field 604. The scanned delivery code field 604 stores information associated with the second-applied barcode 304 assigned to the item, and for example is located on the front of the item 101. This second-applied bar code, stores information about the delivery destination as it was determined at the intake imaging subsystem 201, for example the 11-digit destination code that was determined through OCR technology. Thus, each time an item 101 is transported from one location to another location (such as from initial processing 104 to interim location 108, for example), a new record is created, and the data stored in the scanned delivery code field 604 is determined based on the scan of the second-applied bar code at that location.

The data table 600 further includes a scan location field 608. The scan location field 608 stores data which indicates the location that the scan took place for each individual record. The scan location 608 may be the initial processing system 104, an interim location 108, or a destination processing station 110. The scan location field 608 may further include data that is specific to a machine within a particular location. For example, the scan location field may store data specific to the sorting machine that handled the item 101 within a particular location. Providing this additional granularity in the data captured by within the system allows for more effective identification of sources of anomalies as described in detail below. Also included the table definition 600 is a timestamp field 610. The timestamp field 610 includes the date and time at which record was generated by a scan of the item 101. Although a specific data schema is provided in FIG. 6, a skilled artisan will readily appreciate that this is but one of many different database schemas that may be used in accordance with the embodiments described herein.

Figure 7:
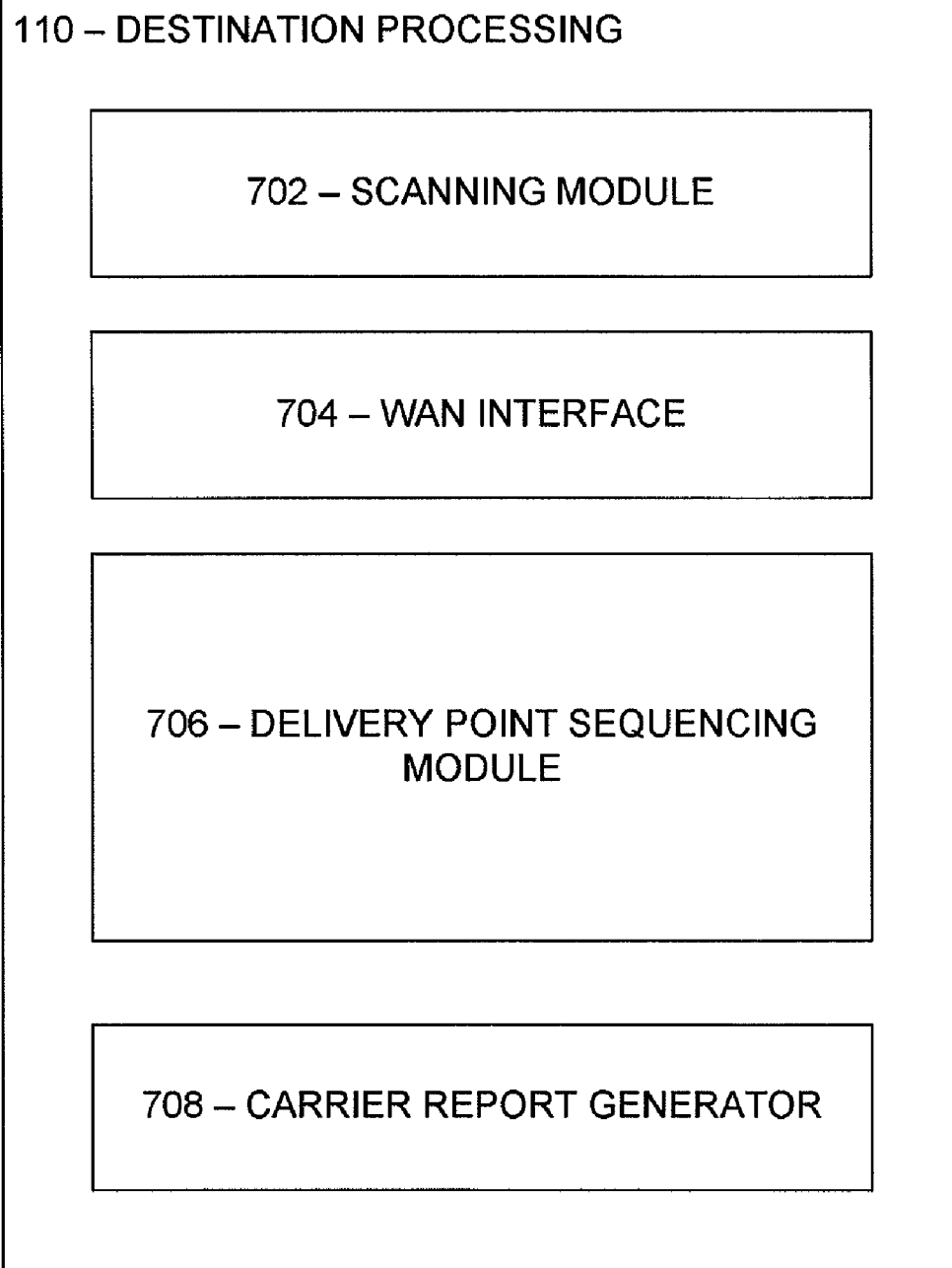
FIG. 7 is a block diagram of a destination processing system for use in the destination processing step of, FIG. 1, in which items are readied for dispatch to their delivery locations.

As discussed above in connection with FIG. 1, once an item has progressed through the interim locations 108, it may then proceed via an item transport 106 to the destination processing station 110. FIG. 7 is a block diagram of several components of a destination processing station 110. The destination processing station 110 may include a scanning module 702. The scanning module 702 scans the both the delivery code barcode 304 (which should directly correspond to the address 302) and the serial number barcode 306 (typically located on the back of the item 101) which is indicative of the serial number assigned to the item 101. The destination processing station 110 may also include a WAN interface 704 which provides access to the network 506 so that the scanned data may be sent to the database 500 for storage. The destination processing station 110 may further include a delivery point sequencing module (DPSM) 706. The delivery point sequencing module 706 typically takes the form of a sorting device that works in conjunction with the scanning module to sort items 101 so that they may be delivered efficiently by the delivery agent 111 to the destination 112.

In some embodiments, the items 101 received at the destination processing station 110 are fed into the DPSM 706 which positions them according to their delivery address as it relates to a delivery route taken by the delivery agent 111. Thus, the items 101 for delivery are ordered such that the all items destined for a particular destination are grouped together so that the delivery agent 111 does not need to search through additional items to find the correct ones. In some embodiments, the items 101 are placed in delivery trays which are carried by the delivery agents 111 to the destinations 112. The items 101 may be further ordered in the trays to correspond to the order that the destinations 112 are reached. Thus, not only are identically addressed items placed together, but groups of items are ordered based on their location in the delivery route.

The destination processing station 110 may also include a carrier report generator 708. The carrier report generator 708 is a computer software and/or hardware module which generates a report for each delivery agent 111 in the distribution environment 100. The reports generated by the carrier report generator 708 typically include information related to the deliveries which are to be made by the delivery and will be discussed in further detail below.

As described above, the distribution environment 100 may maintain computer records in two data tables 400 and 600. The data table 400 is associated with the initial OCR scan of the address 302 on the item 101 and is maintained as a static record. Thus, the serial number and the delivery code stored in database table 400 are static throughout the delivery process as the item 101 moves through the distribution environment 100.

Referring now to FIG. 8, an example of an anomaly detection module 800 is provided which allows distribution and routing errors to be identified within the distribution environment 100. The anomaly detection module (ADM) 800 may generally take the form of a software module running on a computing device which is in communication with the data storage medium 500 over the WAN 506. In one embodiment, the ADM 800 is a web-based application which is accessible through a web browser. In other embodiments, the ADM 800 may be a client server application. In still other embodiments, the ADM may include a mobile client which allows mobile devices to connect to it via the WAN 506 or through some other network such as a wireless telephone network or a proprietary closed network.

The ADM 800 may include a data retrieval module 802. The data retrieval module 802 allows the ADM 800 to retrieve data from other data sources (such as data tables 400 and 600, for example). In one embodiment, the data retrieval module is a software application or software scripts configured to access remote databases via a protocol such as ODBC or some other remote access protocol. Typically, the data retrieval module 802 receives input parameters from the operator of the ADM 800 and issues SQL queries to the remote data sources based on the sought after data. The data retrieved by the data retrieval module 802 may be stored in a data storage module 804 on the ADM 800. The data storage module 804 may take the form of a relational database stored in a memory of the computing device on which the ADM 800 is running. Alternatively, the database may be located on a separate computing device which is accessed via the network 506. Alternatively, the data storage module 804 may be a flat file or some other type of data storage configuration.

Also included in the ADM 800 is a data analysis module 806. The data analysis module 806 generally is used to perform analysis on the data stored in data storage 804 to identify and highlight distribution anomalies reflected in the retrieved data as will be further discussed below. The ADM 800 may further include a service recovery module 808. The service recovery module 808 allows the ADM 800 to send notifications to specific locations such as interim location(s) 108 or a destination processing station 110 which allow personnel to locate items 101 which have been identified by the data analysis module 806 as being misrouted, and then reroute them accordingly. In some embodiments, the service recovery module 806 may be configured to send electronic messages such as e-mail or text messages to responsible personnel at the designated location. Alternatively, the message may be sent to a particular device at a location such as the scanning module 702 at destination processing station 110 which may in turn be configured to reroute the item 101 accordingly.

Figure 9:
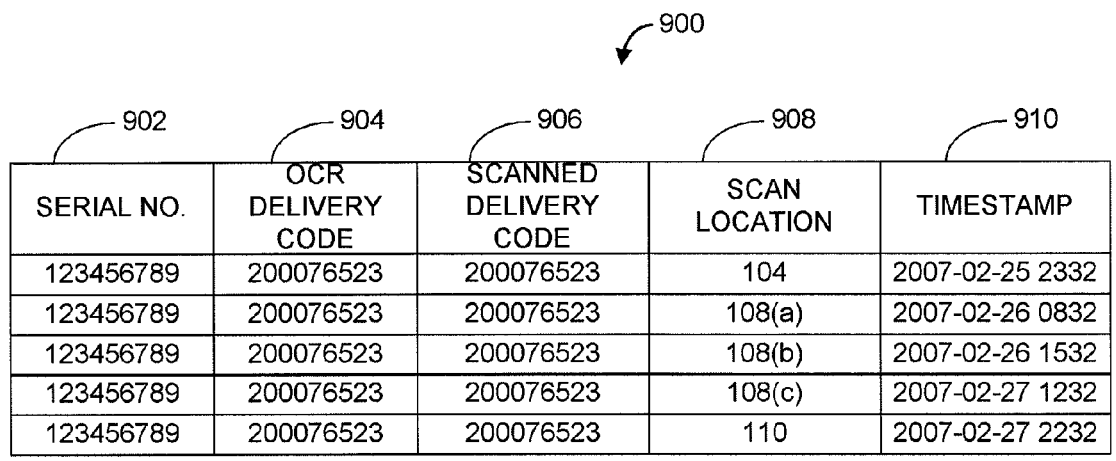
FIG. 9 is an example of a database table created by the anomaly detection module of FIG. 8 showing no routing anomalies.

As noted above, the ADM 800 is typically configured to retrieve data from external data sources in order to identify anomalies which are indicative of potential service impacts. In some embodiments, the ADM 800 is configured to retrieve data from each data table 400 and the data table 600 and use the data analysis module 806 to identify anomalies. FIG. 9 provides an illustration of how the ADM 800 may compile data and identify anomalies based on the analysis performed by the data analysis module 804. In particular, the scanned delivery code 304 and the OCR-based delivery code 308 are compared to determine whether the delivery code scanned at each location in the delivery environment is consistent with the delivery code identified by the intake imaging subsystem 201.

FIG. 9 is an example database table which is created by retrieving data from the data table 400 and combining it with transaction records in the data table 600. In this particular example, an item having serial number 123456789 has been scanned in five locations: initial processing system 104, interim locations 108(a), 108(b), and 108(c), and destination processing station 110. As shown in the dataset, no anomalies are present as the delivery codes in columns 902 and 904 are consistent in each of the records. This consistency indicates that the delivery code barcode 304 has been properly and correctly scanned at each location. If for example, there was an anomaly in the routing of the item, the information in the columns 902 and 904 would be inconsistent.

Figure 10:
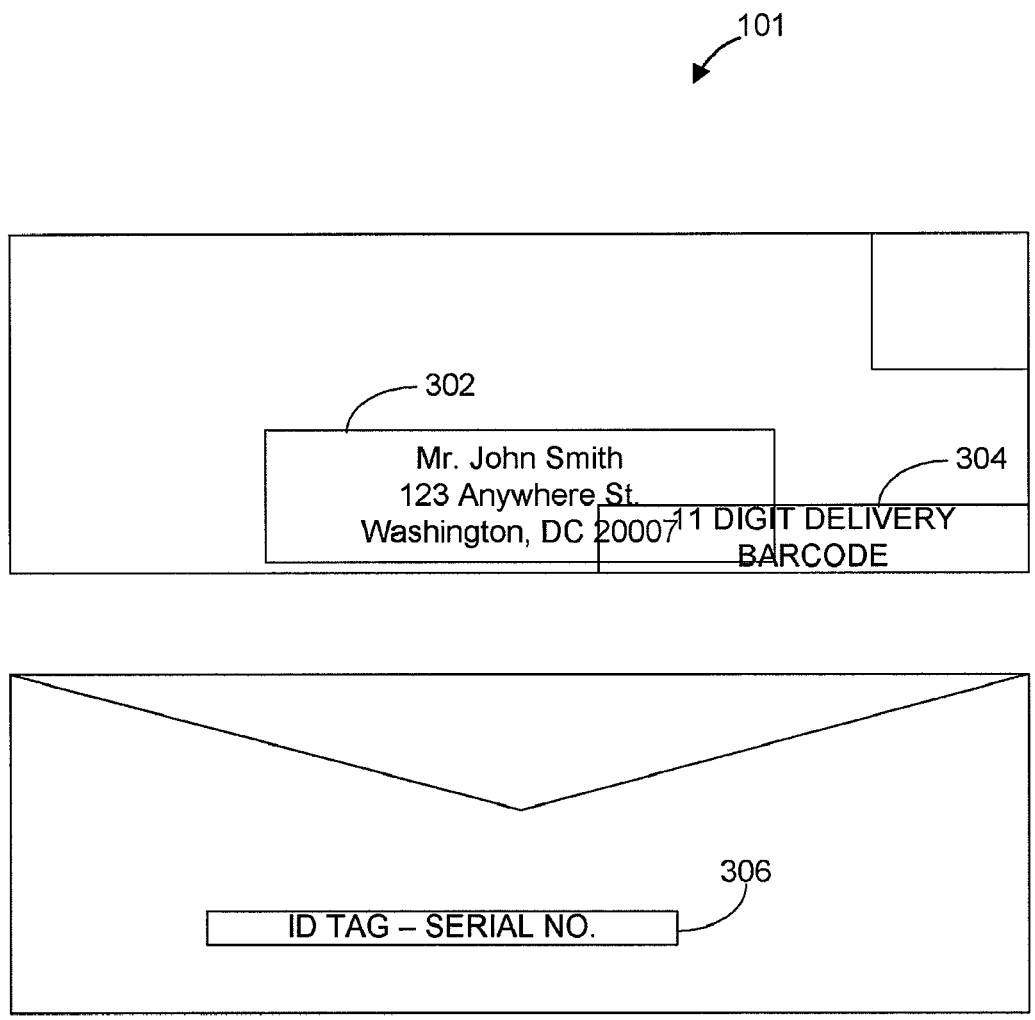
FIG. 10 illustrates front and back views of an envelope which has a modified delivery barcode.

In certain instances, however, events may transpire which cause the scanning procedure at one or more of the locations to fail. For example, in some instances, the delivery code barcode written to the front of the item 101 may be damaged or modified so that it is not properly read by a scanner at either the interim location 108 or the destination processing station 110. FIG. 10 provides one illustration of how the barcode 304 may be made inoperable. As shown in the figure, an item 101 has been processed at the initial processing system 104. The serializer 200 has provided a serial number 306 for the item 101 which has been barcoded on the back as serial number barcode 306. The intake imaging subsystem 201 has captured the address 302 on the envelope and, based on that information, determined the 11 digit delivery code for the item 101. The 11 digit delivery code is written as a barcode 304 in the lower right corner of the front side of the item 101. However, the address 302 has been placed on the item 101 so as to intrude upon the area which carries the delivery code barcode 304. This additional writing may cause the scanning devices such as scanning module 702 (or a scanner located in an interim location 108) to misread the delivery code 304 and as a result, route the item 101 to the wrong destination. Other types of situations may also cause an item to be scanned improperly. In some instances two items 101(a) and 101(b), for example, may become stuck together during transport through the distribution environment 100. As a result, when the stuck together items 101(a) and 101(b) are scanned, the delivery code barcode 304 on the front of the front item 101(a) is scanned, while the serial number code 306 on the back of the back item 101(b) is scanned. The stuck together items are then both routed based on the scanned delivery code barcode 304. As a result, the back item 101(b) is routed to the wrong destination.

Figure 11:
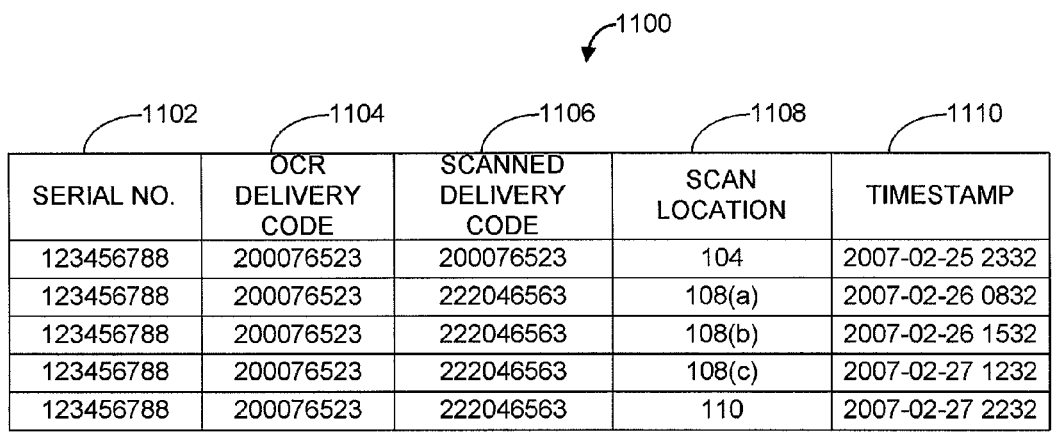
FIG. 11 is an example of a database table created by the anomaly detection module of FIG. 8 showing routing anomalies.

FIG. 11 provides an example of a portion of a data set 1100 retrieved by data retrieval module 802 in which an anomaly has been identified by the data analysis module 806. The item 101 listed in the data set 1100 has a serial number of 123456788 as shown in the serial number column 1102. The delivery code barcode 304, shown in column 1104, and the delivery location associated with the serial number 306, shown in column 1106, for an item should typically match each other in each of the transactions records for an item as described in FIG. 6. As noted above, the delivery location barcode 304 is scanned at each location, while the delivery location associated with the serial number 306 is based on the scanning and OCR performed by the imaging subsystem 201 as described above. Thus, by analyzing the data retrieved by the data retrieval module from the data sets 400 and 600, the ADM 800 is able to determine the occurrence of distribution anomalies as they are occurring within the distribution environment 100. For example, in FIG. 11, row one of each of the columns 1104 and 1106 each contain identical data shown here as 200076523. However, in the second row, the column 1104 contains data comprising 200076523 while column 1106 contains data comprising 222046563. This discrepancy in the data indicates that an anomaly has occurred in that the imaging system delivery location indicated by the serial number 1104 since the related, sorted data no longer matches the data stored in the second row of the scanned delivery location 1106.

Figure 12:
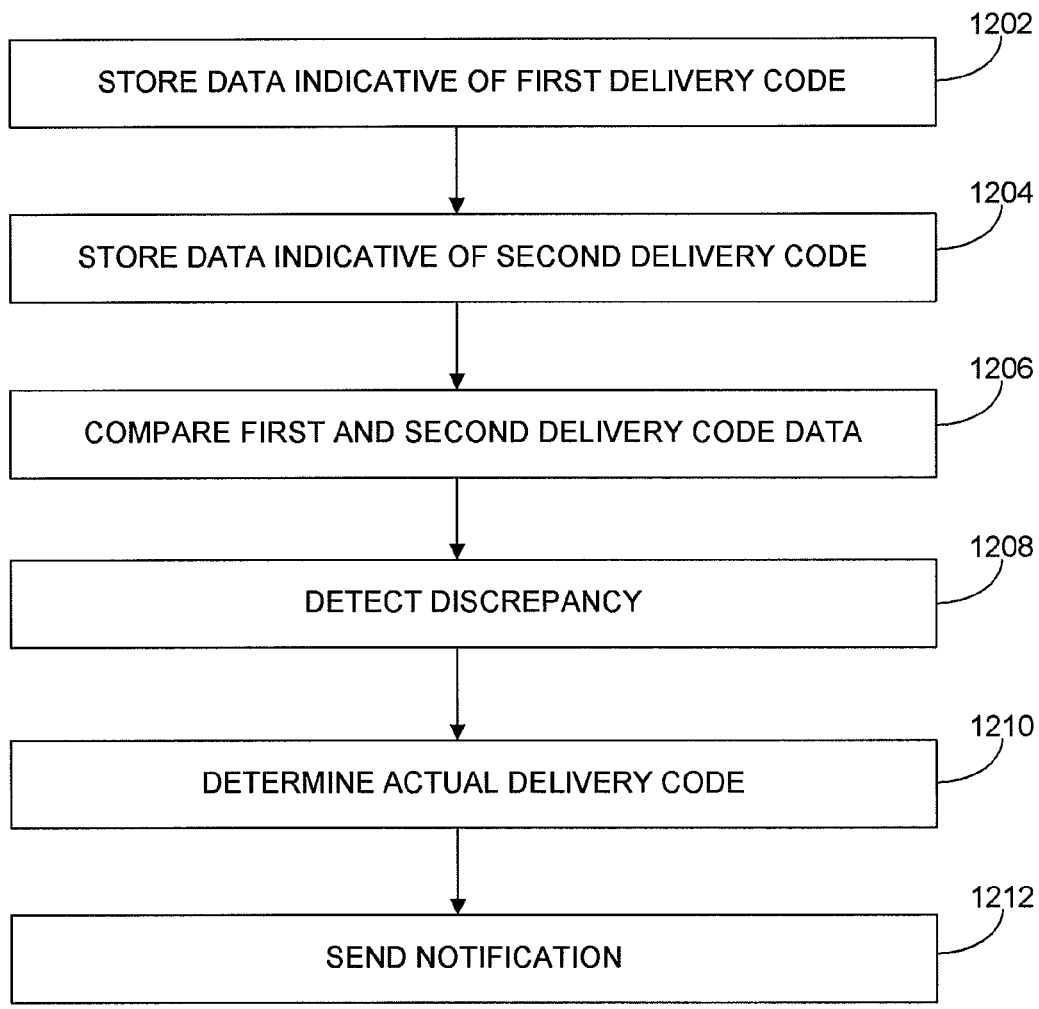
FIG. 12 is a flowchart of a method for detecting routing anomalies in a delivery environment such as that of FIG. 1.

Referring now to FIG. 12, a flowchart provides a process by which the ADM 800 determines anomalies within the distribution environment 100. The process begins at block 1202 where data indicative of a first delivery code associated with an item 101 is stored. In one example described above, this data takes the form of an item serial number 306 which is stored with an OCR-determined delivery code 308 in a data table 400.

The process then moves to block 1204 where data indicative of a second delivery code associated with the item is stored. This data may be, for example, the data generated when the delivery code barcode 304 located on the front of an item 101 is scanned as it moves through the distribution environment 100. In the examples discussed above, this data may be stored in the data table 600. Next, the process moves to block 1206 where the ADM 800 retrieves the stored data (using data retrieval module 802) and compares the first and second delivery code data for the item 101. As discussed above, the data may be retrieved from the data sources via the network 506 and combined into a single merged table such as that shown in FIGS. 9 and 11.

Next, at block 1208, the data analysis module 806 determines whether a discrepancy exists between the first and second delivery code data for one of the records in the combined data. As noted above, a discrepancy provides an indication that there is an anomaly present in the routing data for the item indicating that it has probably been misrouted to an incorrect location. Once the discrepancy has been detected, the correct delivery code is determined by the ADM 800 at block 1210. The correct delivery code is determined by comparing the first bar code with the second bar code for completeness, which may entail for example, verifying that the number of characters in the bar code is correct, and also comparing the bar codes for consistency, which may entail for example, confirming that the destination delivery codes are consistent for the physical location of that processing machine. Typically, the OCR-generated delivery code that is stored in the data table 400, and which corresponds to the first bar code, is the correct intended delivery code, as it was generated based on the initial intake imaging subsystem 201 scan which is less likely to be corrupted while the item is in transit.

Once the correct delivery code has been determined, the process then moves to block 1212, where a notification is sent to the location at which the item has been misrouted. In some embodiments, this notification message may be sent to the carrier report generator 708 of the destination processing station 110. The notification message may alert the delivery agent 111 that there is a misrouted item among his items for delivery. Because the ASM 800 has detected the misrouting based on identifying the incorrect delivery code value which caused the item to be misrouted, the notification message may include details such as the precise location/address to which the item has been misrouted. With this detailed information, the delivery agent 111 is able to intercept and remove the misrouted item before it is delivered to the wrong location. The item delivery code values can then be updated and the item can be placed back into the distribution environment 500 for delivery. In some embodiments, the delivery code may include a check digit that, when added to the sum of the prior digits of the delivery code, results in a sum equal to a multiple of ten. In such an embodiment, the check digit would be utilized to ensure that the entire delivery code is being read. One example of when such a code would flag a discrepancy is when a bar code is visible in a window pane of an envelope but is partially obstructed by the envelope, resulting in a portion of the bar code not being read. In some embodiments, a sorting machine may flag the error and correct the error mechanically. In some embodiments, the sorting machine will flag the error and a human interface will determine the proper corrective action.

In some embodiments, the rules for how to react to a discrepancy can vary. In such embodiments, the administrator can decide, by degree of dissimilarity of the delivery codes, whether to send a message to an appropriate recipient, for example, a mail carrier, or else to let the discrepancy be discovered at the time of delivery and then re-submitted into the delivery system for correction. In some embodiments, this decision might be based on whether or not the corrective action could be taken within a certain period.

It will be understood by those of skill in the art that numerous and various modifications can be made without departing from the spirit of the present development. Therefore, it should be clearly understood that the forms of the development are illustrative only and are not intended to limit the scope of the development. While the above detailed description has shown, described, and pointed out novel features of the development as applied to various embodiments, it will be understood that various omissions, substitutions, and changes in the form and details of the device or process illustrated may be made by those skilled in the art without departing from the spirit of the development.

What is claimed is:

1. A computer-implemented method of identifying a source of misrouted items in a delivery network, the delivery network having a plurality of nodes comprising a delivery route, the method comprising:
    receiving data indicative of the detection of an item at least at some of the plurality of nodes in the delivery network, the data comprising a plurality of records which are each associated with the item as detected at one of the nodes, each of the plurality records having a destination code data field indicative of the a delivery destination for the item;
    determining, by a processor, a first destination code among the records;
    identifying, by a processor, a second destination code among the plurality of records, the second destination code being different from the first destination code; and
    determining, by a processor, based on the location associated with the record having the second destination code, the source of the misrouted item.

2. The method of claim 1, wherein the location associated with the record having the second destination code comprises a node on the delivery route.

3. The method of claim 2, wherein the source of the misrouted item comprises a sorting machine at the node.

4. The method of claim 1, wherein receiving data indicative of the detection of an item at least at some of the plurality of nodes in the delivery network comprises:
    detecting a delivery code barcode on a first portion of the item; and
    detecting a serial number code on a second portion of the item.

5. The method of claim 4, wherein the first surface and the second surface are different portions of the item.

6. The method of claim 5, wherein the misrouting of the misrouted item is caused by the misrouted item being arranged in such a position relative to a second item prior to scanning the misrouted item, that the delivery barcode of the second item is associated with the serial number code of the first item.

7. The method of claim 4, further comprising producing a notification to a delivery agent including a location to which the misrouted item has been misrouted.

8. A non-transitory computer-readable medium having computer executable instructions stored thereon which, when executed cause a computing device to perform a method of identifying a source of misrouted items in a delivery network, the delivery network having a plurality of nodes comprising a delivery route, the method comprising:
   receiving data indicative of the detection of an item at least at some of the plurality of nodes in the delivery network, the data comprising a plurality of records each associated with the item as detected at one of the nodes, each of the plurality records having a destination code data field indicative of the a delivery destination for the item;
   determining a first destination field among the records;
   identifying a second destination field among the plurality of records, the second value being different from the first value; and
   determining, based on the location associated with the record having the second destination code, the source of the misrouted item.

9. The computer-readable medium of claim 8, wherein the location associated with the record having the second value comprises an interim location.

10. The computer-readable medium of claim 9, wherein the source of the misrouted item comprises a sorting machine at the interim location.

11. The computer-readable medium of claim 8, wherein receiving data indicative of the detection of an item at least at some of the plurality of nodes in the delivery network comprises:
   detecting a delivery code barcode associated with a first portion of the item; and
   detecting a serial number code associated with a second portion of the item.

12. The computer-readable medium of claim 11, wherein the first portion and the second portion are opposite surfaces of the item.

13. The computer-readable medium of claim 11, wherein detecting a delivery code comprises scanning a delivery code barcode associated with a first or second portion of the item.

14. The computer-readable medium of claim 12, wherein the misrouting of the misrouted item is caused by the misrouted item being arranged in such a position relative to a second item prior to scanning the misrouted item, that the delivery barcode of the second item is associated with the serial number code of the first item.

15. The computer-readable medium of claim 11, further comprising sending a notification to a delivery agent including a location to which the misrouted item has been misrouted.

16. A system for identifying a source of misrouted items in a delivery network, the delivery network comprising a plurality of nodes comprising a delivery route, the system comprising:
   means for receiving data indicative of the detection of an item at least at some of the plurality of nodes in the delivery network, the data comprising a plurality of records each associated with the item as detected at one of the nodes, each of the plurality records having a destination code data field indicative of a delivery destination for the item;
   means for determining a first destination code among the records;
   means for identifying a second destination code among the plurality of records, the second destination code being different from the first destination code; and
   means for determining, based on the location associated with the record having the second destination code, the source of the misrouted item.

* * * * *

UNITED STATES PATENT AND TRADEMARK OFFICE
CERTIFICATE OF CORRECTION

PATENT NO. : 8,335,693 B2  
APPLICATION NO. : 13/434662  
DATED : December 18, 2012  
INVENTOR(S) : Gary D Walls Page 1 of 1

It is certified that error appears in the above-identified patent and that said Letters Patent is hereby corrected as shown below:

In the Specifications:

In Column 1, Line 48, Change "itself" to --itself.--.

In the Claims:

In Column 12, Line 42, In Claim 1, after "of" delete "the".

In Column 13, Line 20, In Claim 8, after "of" delete "the".

Signed and Sealed this  
Third Day of September, 2013

Teresa Stanek Rea  
*Acting Director of the United States Patent and Trademark Office*